United States Patent [19]
Phelps

[11] 4,007,241
[45] Feb. 8, 1977

[54] COMBINATION HUMIDIFYING AND COOLING APPARATUS AND METHOD

[76] Inventor: Peter M. Phelps, 15 Buckeye Way, Kentfield, Calif. 94904

[22] Filed: Oct. 1, 1975

[21] Appl. No.: 618,499

Related U.S. Application Data

[63] Continuation-in-part of Ser. No. 327,154, Jan. 26, 1973, Pat. No. 3,917,764.

[52] U.S. Cl. .............................. 261/149; 261/18 B; 261/22; 261/DIG. 11
[51] Int. Cl.² .......................................... F28C 1/06
[58] Field of Search ................ 261/147, 149, 18 R, 261/18 B, 22, DIG. 11

[56] References Cited

UNITED STATES PATENTS

| | | | |
|---|---|---|---|
| 2,545,926 | 3/1951 | LauBach | 261/DIG. 11 |
| 2,826,397 | 3/1958 | Lofgren et al. | 261/147 |
| 2,971,750 | 2/1961 | Boling | 261/111 |
| 3,227,429 | 1/1966 | Renzi | 261/112 |
| 3,643,931 | 2/1972 | Henning et al. | 261/112 |
| 3,785,121 | 1/1974 | Phelps | 261/149 |

FOREIGN PATENTS OR APPLICATIONS

| | | | |
|---|---|---|---|
| 437,282 | 1935 | United Kingdom | 261/DIG. 77 |

Primary Examiner—Tim R. Miles
Assistant Examiner—Gregory N. Clements
Attorney, Agent, or Firm—Flehr, Hohbach, Test, Albritton & Herbert

[57] ABSTRACT

A combination humidifying and cooling apparatus and method. The humidifying section, including a liquid recycle line, is disposed outboard of a liquid cooling section. Air is directed into the humidifying section where it is humidified without significantly raising its wet bulb temperature prior to passing into the cooling section. This reduces the amount of water evaporated in the cooling section. By recycling liquid in the humidifying section, the solids content of the blowdown therefrom can be highly concentrated without adversely affecting the cooling liquid circuit.

16 Claims, 3 Drawing Figures

COMBINATION HUMIDIFYING AND COOLING APPARATUS AND METHOD

CROSS-REFERENCE TO RELATED APPLICATIONS

This application is a continuation-in-part of my copending application Ser. No. 327,154, filed Jan. 26, 1973, now Pat. No. 3,917,764 entitled "Sloped Film Fill Assembly Cooling Tower" and of my copending application Ser. No. 610,690, filed Sept. 5, 1975 of the same title.

BACKGROUND OF THE INVENTION

In order to replace loss of cooling liquid (e.g., water) during evaporation in a conventional cooling tower, it is necessary to add make-up water to the water circuit. Such water includes dissolved minerals. Since the water lost by evaporation does not include dissolved minerals, the mineral content in the water circuit continuously increases as make-up water is added. There is a maximum mineral content which is permissible in the cooling water circuit before problems occur such as scaling on heat exchanger tubes. To maintain the mineral content below this level, it is conventional to bleed off a blowdown stream.

In arid climates such as the Southwest United States, Mexico, Australia, Spain, Italy or the Persian Gulf, it is essential to minimize the amount of water lost in the blowdown of such cooling towers. Thus, in such countries the mineral content is raised to the maximum level permissible without causing problems in the cooling water circuit. It would be desirable to further decrease the water content of the blowdown to conserve water.

The mineral content of blowdown can be harmful to the area surrounding the disposal site, either on land or in a body of water. To avoid this, sealed evaporator ponds often provided for disposal of the blowdown from cooling towers. Since it is costly to construct large sealed evaporator ponds, it would be desirable to reduce the liquid content of the blowdown to reduce the pond size.

SUMMARY OF THE INVENTION AND OBJECTS

In the present invention, a humidifying section is disposed outboard of a cooling tower. Air passing through the humidifying section is humidified prior to passage into the cooling tower without any significant increase in the wet bulb temperature. In the cooling section, the liquid is cooled by contact with the cooled humid air, thereby minimizing water loss due to evaporative cooling therein. A portion of the water collected in the cooling tower is directed to the humidifying section. This liquid, which may be supplemented from an auxiliary source, is recycled in the humidifying section by suitable pumping means to concentrate the solids content therein. This reduces the blowdown rate from the humidifying section. By providing a barrier between liquid collected in the cooling and humidifying sections, the latter section may be operated at a significantly higher solids content than the former one. This is important because the maximum permissible mineral content in the cooling liquid circuit is normally substantially below that which can be tolerated in the humidifying section.

It is an object of the invention to provide a means for conserving water in a cooling tower and also reducing the blowdown rate of the same while maintaining a tolerable level of mineral content in the liquid cooling circuit.

It is a particular object of the invention to accomplish the foregoing by use of a humidifying section outboard of a liquid cooling section so that the air may be pre-humidified prior to passage into the cooling section.

It is another object of the invention to provide apparatus for cooling liquid in which the blowdown rate can be varied over a wide range.

It is another object of the invention to provide a system for cooling water in which the water evaporation loss in the cooling tower is minimized.

Additional objects and features of the invention will be apparent from the following description taken in conjunction with the appended drawing.

DETAILED DESCRIPTION OF THE PREFERRED EMBODIMENTS

Figure 1:
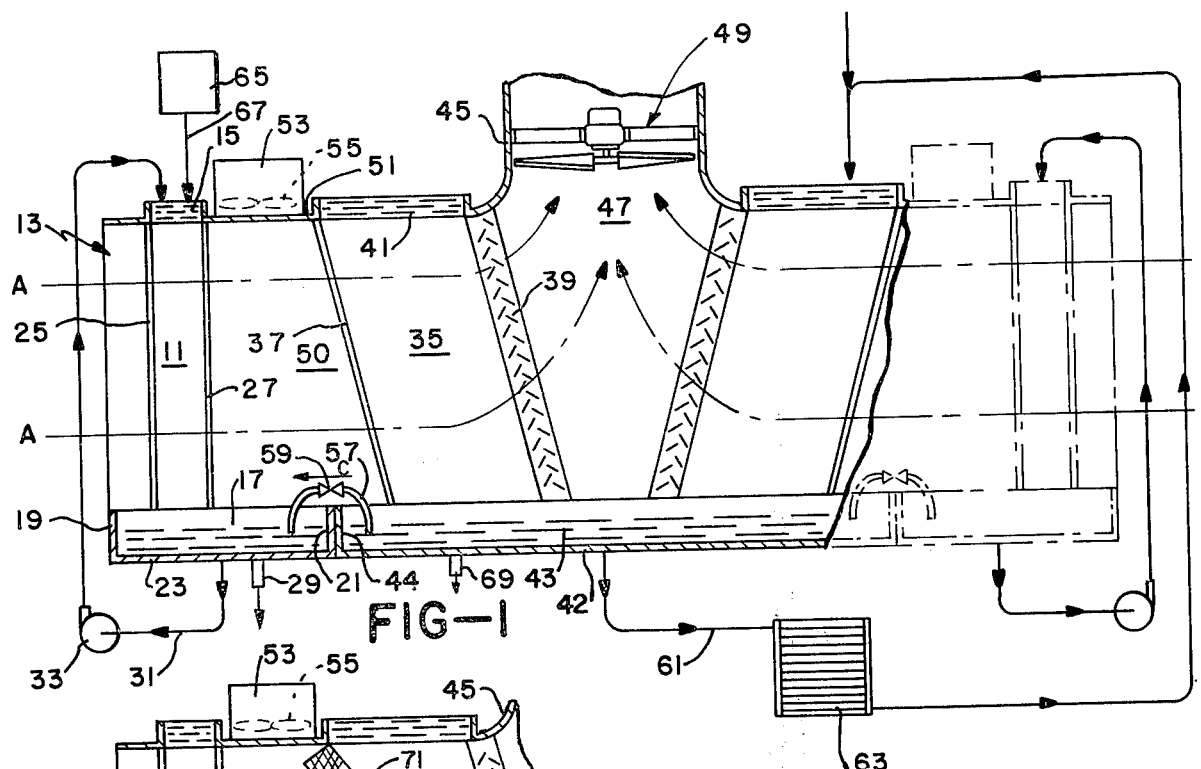
FIG. 1 is a cross-sectional view of one embodiment of the combination humidifying and cooling apparatus of the present invention in which the cooling section is of a crossflow type.

Referring to FIG. 1, a combination humidifying and cooling apparatus is illustrated in which the cooling section is of the crossflow type. The portion in phantom is identical to the portion illustrated to the left of the apparatus. For simplicity of description, only one side of the tower will be described in detail with like numbers describing like portions of both sides of the apparatus.

Referring to FIG. 1, a humidifying section 11 is illustrated to the outboard side of the apparatus and includes conventional crossflow fill (not shown) such as horizontally disposed splash decks or upright corrugated sheets. An air inlet opening 13 is provided in the outer wall of the tower. A water distribution tray 15 is disposed above section 11 including openings of size to distribute liquid uniformly over the fill in section 11 for gravitation therethrough and collection in a collection basin 17 defined by upright side walls 19 and 21 and bottom wall 23. Upright side walls 25 and 27 of section 11 may be either of an air louver type or totally open to permit air to freely pass therethrough. A blowdown liquid outlet pipe 29 is provided for basin 17. Such pipe may comprise a conduit to a suitable disposal area such as a sealed blowdown evaporator pond or the like.

Recycle means is provided for directing liquid from basin 17 to distribution tray 15. Such recycle means includes conduit 31 and pump 33 disposed intermediate the ends of the conduit.

A liquid cooling section 35 including crossflow fill such as spaced splash plates is disposed inboard or to the interior of the apparatus from humidifying section 11. Section 35 includes an air inlet opening 37 comprising an open side of the same and a drift eliminator wall 39 at the air outlet side. A liquid distribution tray 41 is positioned directly above section 35 including a perforate bottom wall to permit liquid to gravitate onto the upper portion of the fill. A collection basin 43 is disposed below section 35 to collect water gravitating therethrough and includes a bottom wall 42 and upright side wall 44 adjacent side wall 21 of basin 17.

A stack 45 is secured to the top face of the apparatus and extends upwardly from a central plenum chamber 47 to form an outlet for air exiting therefrom. Fan means 49 positioned within stack 45 is adapted to be operably coupled to a suitable source of power for actuation. In operation, air is caused to be drawn through the apparatus generally along path A for discharge through stack 45. An air conduit 50 interconnects side wall 27 of humidifying section 11 and air inlet openings 37 of liquid cooling section 35. Conduit 50 is defined above by a top wall 51.

In an alternative embodiment, illustrated in phantom, a stack 53 may be provided with an induction fan 55 to draw moisture laden air exiting from humidifying section 11.

Basin walls 21 and 44 form a barrier for separating the liquid in basins 17 and 43. A liquid transport conduit or pipe 57 is provided for directing liquid from basin 43 to basin 17. Valve 59 is operatively associated with pipe 57. Valve 59 permits water to flow only in the direction indicated by the arrow C and is adjustable between a fully opened and fully closed position. If necessary, pumping means, not shown, may be provided for pipe 57.

Referring again to FIG. 1, liquid withdrawn from basin 43 is conventionally used as a coolant which is directed through recycle line 61 to cool one or more heat exchangers designated 63 as for an air conditioning system. This liquid is then again recycled to basin 43.

Liquid may be supplied to humidifying section 11 from a source 65 through conduit 67. Source 65 is independent from the liquid in cooling section 35. Since the solids content of liquid from source 65 do not flow into cooling section 35, source 65 may include contaminants which would not be acceptable for use in the cooling liquid circuit of line 61. Thus, source 65 may include sewage water or salt water.

An outlet pipe 69 may be provided for basin 43 if desired. One purpose for pipe 69 would be to draw off liquid gravitating through section 35 of lower solids content than the liquid in blowdown pipe 29.

In accordance with the method of the present invention, the make-up cooling liquid requirements in cooling section 35 are significantly reduced by pre-humidifying the incoming air in humidifying section 11. Thus air is directed along path A into humidifying section 11. There, the air is humidified, typically to near saturation, by evaporation of liquid gravitating from tray 15, prior to passage into cooling section 35. Liquid in line 61 is directed through heat exchanger 63 in which it is warmed by heat transfer from a heat generating source and the warmed liquid is recycled to tray 41 for distribution into the cooling section.

Humidification is a relatively efficient operation in which the temperature of the air is reduced while the water evaporates so that it enters cooling section 35 at approximately the same wet bulb temperature, but in a near saturated condition. By prehumidifying the air, significantly less water is lost by evaporation in cooling section 35. Thus, the requirement to continuously add make-up liquid to cooling section 35 is substantially lowered. This reduces build-up of the mineral content in cooling section 35 which could adversely affect the cooling liquid circuit, especially the efficiency of the pipes in heat exchangers 63. Such pipes are corroded and subject to scale formation in the presence of a high mineral content.

Referring to humidifying section 11, a portion of the liquid received in basin 17 is withdrawn as blowdown. Another portion of such liquid is recycled via conduit 31 to distribution tray 15 above the cooling section. The solids content of the blowdown withdrawn in pipe 29 can be closely controlled by varying the flow rate in the blowdown line 29 in comparison to that received through line 57. In other words, for a given flow rate through line 57, some of the liquid is evaporated into the air stream flowing through the humidifier and less liquid is thereby removed as blowdown through pipe 29. Thus, the solids content of the liquid removed as blowdown from the humidifier is concentrated during humidification of the air passing therethrough. This does not present problems in operation of the humidifying section since it is not nearly as sensitive to a high mineral content as is the cooling liquid circuit which includes heat exchange pipes and the like.

If desired, a portion of the moisture-laden air downstream from humidifying section 11 may be withdrawn from the system prior to being received by cooling section 35. This may be accomplished by operating fan 55 to induce air to flow out of stack 53. In this manner, the total volume of liquid evaporated from humidifying section 11 may be increased to further concentrate the blowdown from pipe 29.

In the embodiment of FIG. 1, liquid from basin 43 is directed through conduit 57 into basin 17 of the humidifying section 11 at a rate controlled by valve 59. In this manner, the liquid content of the blowdown from pipe 29 can be significantly varied thereby altering the total blowdown rate and solids content in both basins 17 and 43.

Liquid may be withdrawn from optional outlet pipe 69 from cooling section basin 43. Since this liquid has a relatively low mineral content in comparison to the blowdown from pipe 29, it may be employed as a liquid source for some other operation or passed directly into a body of water or into the soil instead of into a sealed blowdown pond.

Since liquid in the humidifying section is prevented from flowing into the cooling section, a stream of liquid independent from the cooling liquid circuit may be supplied to the humidifying section. This stream can include a solids content which is unusable in the latter circuit. Thus, for example, salt water or sewage water from source 65 may be directed into distribution tray 15 for section 11 without adversely affecting the sensitive elements in the cooling liquid circuit.

The above system is particularly effective in an arid climate in which the amount of water evaporaed in a conventional cooling tower requires a large volume of blowdown. Use of the present system can minimize such blowdown.

In a hot arid climate, there is a large variation in daytime and nighttime temperature of the surroundings and, consequently, in the amount of cooling liquid required for heat exchangers used for air conditioning or the like. Thus, it is important to provide sufficient flexibility in the system to substantially reduce the amount of liquid flowing in the liquid cooling circuit line 61 during nighttime operation in comparison to daytime operation. Such reduction may be accompanied by partially closing valve 59 to permit decreased amounts of water to be directed from basin 43 into basin 17.

Figure 2:
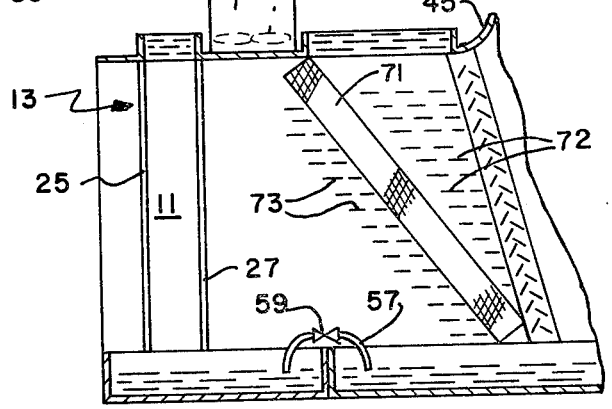
FIG. 2 illustrates an area of the tower of FIG. 1 in which the cooling section is of a sloped film fill type.

Referring to FIG. 2, a portion of the system of FIG. 1 is illustrated in which liquid cooling section 35 is of the type set forth in the aforementioned U.S. applications Ser. Nos. 327,154 and 610,698. Briefly described, the cooling section includes film fill means 71 having a principal plane inclined at a substantial angle, e.g., between about 20° and 70° to the vertical. The film fill means comprises a plurality of sheets (not shown) mounted so that adjacent sheets are generally parallel to the air path and are sufficiently spaced apart for the passage of air along its path and of liquid gravitating from the liquid supply means. The sheets are essentially vertically disposed to provide an essentially vertical path to the liquid. Splash fill comprising splash plates 72 are disposed adjacent to the upper and lower sides of the film fill means, the upper ones being disposed between the film fill means and water distribution means. Thus, the upper splash plates provide more even distribution to liquid gravitating onto the film fill means.

In a particularly effective embodiment, the film fill means comprises a plurality of film forming corrugated sheets having ridges and grooves mounted so that the ridges of alternate sheets contact and cross the ridges disposed between alternate sheets so that the liquid redistributes at the intersection points. As fully set forth in application Ser. No. 327,154, the sloped film fill cooling section provides particularly efficient gas-liquid contact which combines the best features of crossflow and counterflow cooling towers.

Figure 3:
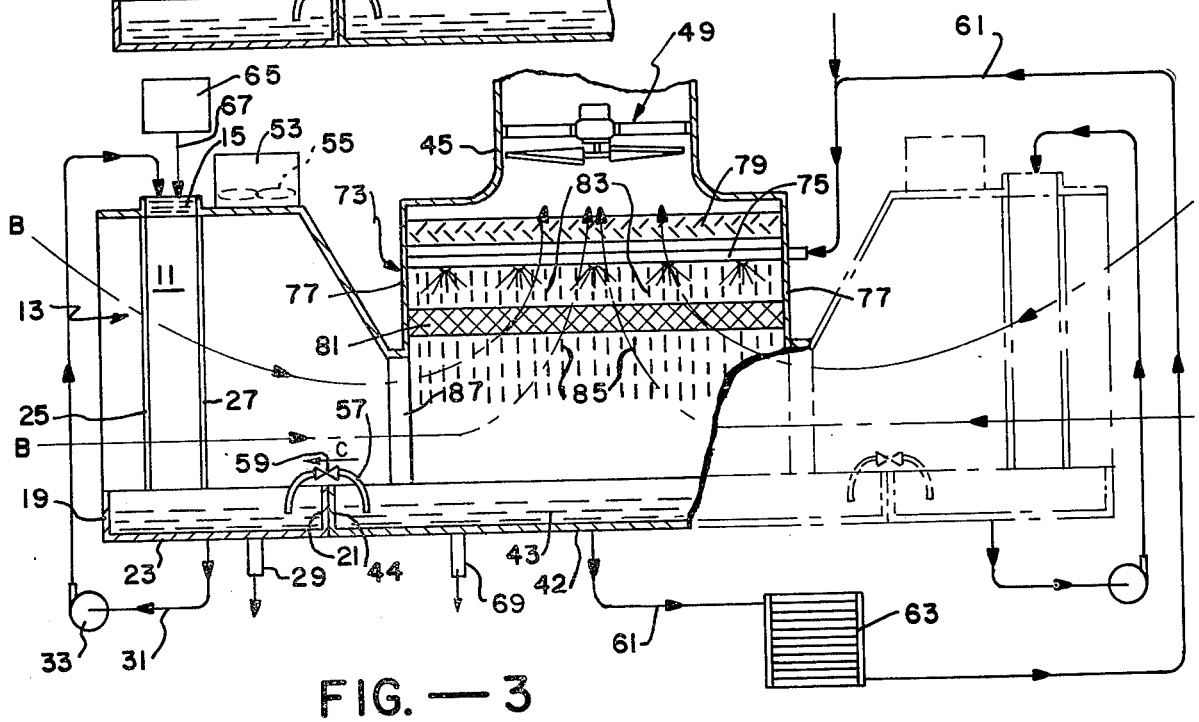
FIG. 3 is a schematic cross-sectional view of another embodiment of the invention in which the cooling section is of the counterflow type.

Referring to FIG. 3, a combination humidifying and cooling apparatus is illustrated similar to the foregoing one with the only essential difference being the substitution of a cooling section 73 of a counterflow type for the crossflow cooling section 35. Like numbers will be used to designate like portions of the apparatus of FIGS. 1 and 3. Cooling section 73 is disposed centrally of the apparatus and includes a series of distribution pipes 75 containing a plurality of spaced conventional nozzles above section 73 to spray or distribute liquid evenly onto the upper portion of the section for gravitation therethrough and collection in basin 43. Section 73 includes imperforate side walls 77 and a drift eliminator top wall 79. Conventional counterflow fill 81 is disposed horizontally across section 73 and includes substantially vertical air and water passages to permit free counterflow of gravitating water and air to provide vertical planar surfaces upon which the gravitating water can form a film of relatively large area to provide heat transfer contact surface between the air and water. Wall 79 may be of any conventional type, such as a series of inclined baffles to permit air to freely exhaust therethrough but to minimize the escape of water droplets.

Splash type fill 83 may be disposed between distribution pipe 75 and film fill 81 to provide more even distribution of the liquid onto the film fill. Additional splash type fill 85 may be disposed below film fill 81 to further increase the efficiency of air-liquid contact.

In operation, air directed through humidifier 11 absorbs water vapor to near saturation as set forth above. The moisture-laden air continues along path B, suitably through inlet 87, and upwardly through film fill 81 by induction from fan means 49 out of stack 45. Simultaneously, water is distributed from pipe 75 through the nozzles onto splash type fill 83 through film fill 81 and splash type fill 85 and is collected in basin 43. The overall system of FIG. 3 operates in analogous manner to that set forth in FIG. 1 with the exception of the conventional difference of crossflow and counterflow cooling sections.

It is apparent from the foregoing that various modifications of the invention can be made without departing from the scope of the invention. Thus, various types of fill may be employed in either the humidifying or cooling sections. Likewise, a high stack for inducing air flow by chimney action can be substituted for the fan assembly.

What is claimed is:
1. A combination humidifying and cooling apparatus comprising,
   a. a humidifying section including fill means, an air inlet opening communicating with the surrounding air, an air outlet opening, liquid distribution means disposed in the upper portion of the section, liquid collection means disposed in the lower portion of the section, and a blowdown liquid outlet for said liquid collection means,
   b. recycle means consisting essentially of a conduit and associated pumping means for directing liquid from the humidifying section liquid collection means directly to the humidifying liquid distribution means,
   c. a liquid cooling section including fill means, an air inlet opening in generally open communication with the humidifying section air outlet opening, an air outlet opening, liquid distribution means disposed in the upper portion of the liquid cooling section to distribute the liquid onto said fill means, and liquid collection means disposed in the lower portion of the same, said air inlet and outlet openings being disposed to provide an air path through said fill means to intersect liquid gravitating through the same,
   d. barrier means for separating said cooling section collection means and humidifying section collection means, and
   e. a recycle line to provide communication with said cooling section liquid collection means and cooling section liquid distribution means, and heat exchange means associated with said recycle line for transmitting heat from a heat source to the liquid flowing through the heat exchanger.

2. The apparatus of claim 1 together with liquid transport means for directing liquid from said cooling section liquid collection means to said humidifying section liquid collection means.

3. The apparatus of claim 1 together with first fan means operatively associated with said second liquid cooling section.

4. The apparatus of claim 1 together with air conduit means interconnecting said humidifying section air outlet opening and said cooling section air inlet opening, and second fan means communicating with said air conduit means and the surrounding air to draw moisture-laden air from the air conduit means.

5. The apparatus of claim 1 in which the cooling section is of the counterflow type.

6. The apparatus of claim 5 in which film fill means is disposed generally horizontally in said counterflow cooling section and splash fill means is disposed adjacent said film fill means in said cooling section.

7. The apparatus of claim 1 in which the cooling section is of the crossflow type.

8. The apparatus of claim 1 in which the fill means of the cooling section comprises film fill means with a sloped principal plane comprising a plurality of spaced adjacent sheets essentially vertically disposed to provide an essentially vertical path to the liquid gravitating from the cooling section liquid distribution means.

9. The apparatus of claim 8 in which the principal plane of the sloped film fill means is inclined at an angle of between about 20° and 70° to the vertical.

10. The apparatus of claim 8 together with splash-type fill disposed in the cooling section between said cooling section film fill means and cooling section liquid distribution means.

11. The apparatus of claim 1 together with a source of liquid independent from the liquid in said cooling section and conduit means for transporting liquid from said independent liquid source to said humidifying section distribution means.

12. In a method for reducing the make-up cooling liquid requirements in a filled direct liquid-air contact cooling section, in which air is directed in a path from the surrounding environment through a cooling section, and the liquid is cooled in the cooling section by gravitation from a liquid distribution means through the cooling section fill means through which the air is directed into a cooling section collection means, the steps of a. prehumidifying the air in said path prior to passage through the cooling section in a separate humidifying section by directly contacting the air with liquid gravitating from a humidifying section liquid distribution means onto fill means in said section to a humidifying section liquid collection means separated from said cooling section collection means whereby the air entering said cooling section is humidified with moisture from the humidifying section so that liquid evaporated in the cooling section is reduced, b. recycling a portion of the liquid received by the humidifying section collection means directly to the humidifying section liquid distribution means, c. directing at least a portion of the liquid in the cooling section collection means through a heat exchange zone in which it is warmed by heat transfer from a heat generating source, and d. recycling the warmed liquid to the cooling section liquid distribution means.

13. The method of claim 12 in which liquid is transported from the cooling section liquid collection means to the humidifying section but is prevented from flowing in the reverse direction.

14. The method of claim 13 in which the liquid in the cooling section includes a solids content at a given concentration and the solids content of the liquid in the humidifying section is concentrated during humidification of the air passing therethrough to a solids content higher than said given concentration.

15. The method of claim 12 in which a portion of the humidified air is withdrawn from the air path between the humidifying section and cooling section to increase the total volume of liquid withdrawn from the humidifying section as evaporation.

16. The method of claim 12 in which liquid from a stream independent from the liquid supplied to the cooling section is supplied to the humidifying section distribution means.

* * * * *